United States Patent [19]

Patel

[11] Patent Number: 5,895,486
[45] Date of Patent: Apr. 20, 1999

[54] METHOD AND SYSTEM FOR SELECTIVELY INVALIDATING CACHE LINES DURING MULTIPLE WORD STORE OPERATIONS FOR MEMORY COHERENCE

[75] Inventor: Rajesh Bhikhubhai Patel, Austin, Tex.

[73] Assignee: International Business Machines Corporation, Armonk, N.Y.

[21] Appl. No.: 08/770,997

[22] Filed: Dec. 20, 1996

[51] Int. Cl.[6] .................................................. G06F 12/12
[52] U.S. Cl. .......................... 711/121; 711/119; 711/133; 711/141; 711/145
[58] Field of Search ............................. 711/3, 119, 120, 711/121, 124, 130, 141, 142, 143, 144, 145, 146, 148, 156, 163, 165, 210

[56] References Cited

U.S. PATENT DOCUMENTS

| | | | |
|---|---|---|---|
| 5,155,824 | 10/1992 | Edenfield et al. | 711/143 |
| 5,155,843 | 10/1992 | Stamm et al. | |
| 5,226,144 | 7/1993 | Moriwaki et al. | 711/121 |
| 5,291,442 | 3/1994 | Emma et al. | 711/120 |
| 5,317,720 | 5/1994 | Stamm et al. | |
| 5,333,296 | 7/1994 | Bouchard et al. | |
| 5,347,648 | 9/1994 | Stamm et al. | |
| 5,404,483 | 4/1995 | Stamm et al. | |
| 5,524,212 | 6/1996 | Somani et al. | 711/121 |
| 5,701,503 | 12/1997 | Singh et al. | 711/126 |
| 5,724,501 | 3/1998 | Dewey et al. | 395/182.07 |

*Primary Examiner*—Tod R. Swann
*Assistant Examiner*—J. Peikari
*Attorney, Agent, or Firm*—Casimer K. Salys; Michael A. Davis, Jr.

[57] ABSTRACT

A method and system for reducing bus traffic in a multiple processor system having a shared memory and processor related private caches. Store multiple word instructions are evaluated to determine whether a full cache line is to be modified. If the full cache line is to be stored, a cache line kill is issued on the system bus and the cache line is written to the cache. Any store operation of single word, or multiple words extending over portions of a cache line, invokes conventional memory coherence processes.

9 Claims, 6 Drawing Sheets

METHOD AND SYSTEM FOR SELECTIVELY INVALIDATING CACHE LINES DURING MULTIPLE WORD STORE OPERATIONS FOR MEMORY COHERENCE

TECHNICAL FIELD

This patent application relates in general to information processing systems and in particular to a method and system for maintaining memory coherency.

BACKGROUND

A system for processing information can include a system memory. Moreover, one or more devices of the system can include a cache memory. A cache memory is a relatively small high-speed memory that stores a copy of information from one or more portions of the system memory.

Frequently, the cache memory is physically distinct from the system memory. Each device manages the state of its respective cache memory. A device can copy information from a portion of the system memory into the device's cache memory, and the device can modify information in its cache memory.

In a coherent memory system, all devices operate in response to the most recent version of information for the system memory. Such coherency allows synchronization, cooperative use of shared resources, and task migration among the devices. For maintaining memory coherency, a device can copy modified information from its cache memory back to a portion of the system memory.

Such copying adds traffic through the system bus. The added traffic is significant where a first device frequently modifies information for the system memory while a second device frequently attempts to input the information. By adding traffic through the system bus, overall performance of the system is degraded.

Thus, a need has arisen for a method and system for maintaining memory coherency, in which traffic through the system bus is diminished relative to previous techniques. Also, a need has arisen for a method and system for maintaining memory coherency, in which overall performance of the system is improved.

In response to an instruction specifying all of a portion of information, all of the portion is written into a first memory without copying the portion from a second memory, independent of whether the portion is previously modified within the second memory.

It is a technical advantage that traffic through a system bus is diminished relative to previous techniques.

It is another technical advantage that overall performance of the system is improved.

BRIEF DESCRIPTION OF THE DRAWING

An illustrative embodiment and its advantages are better understood by referring to the following descriptions and accompanying drawing, in which.

DETAILED DESCRIPTION

Figure 1:
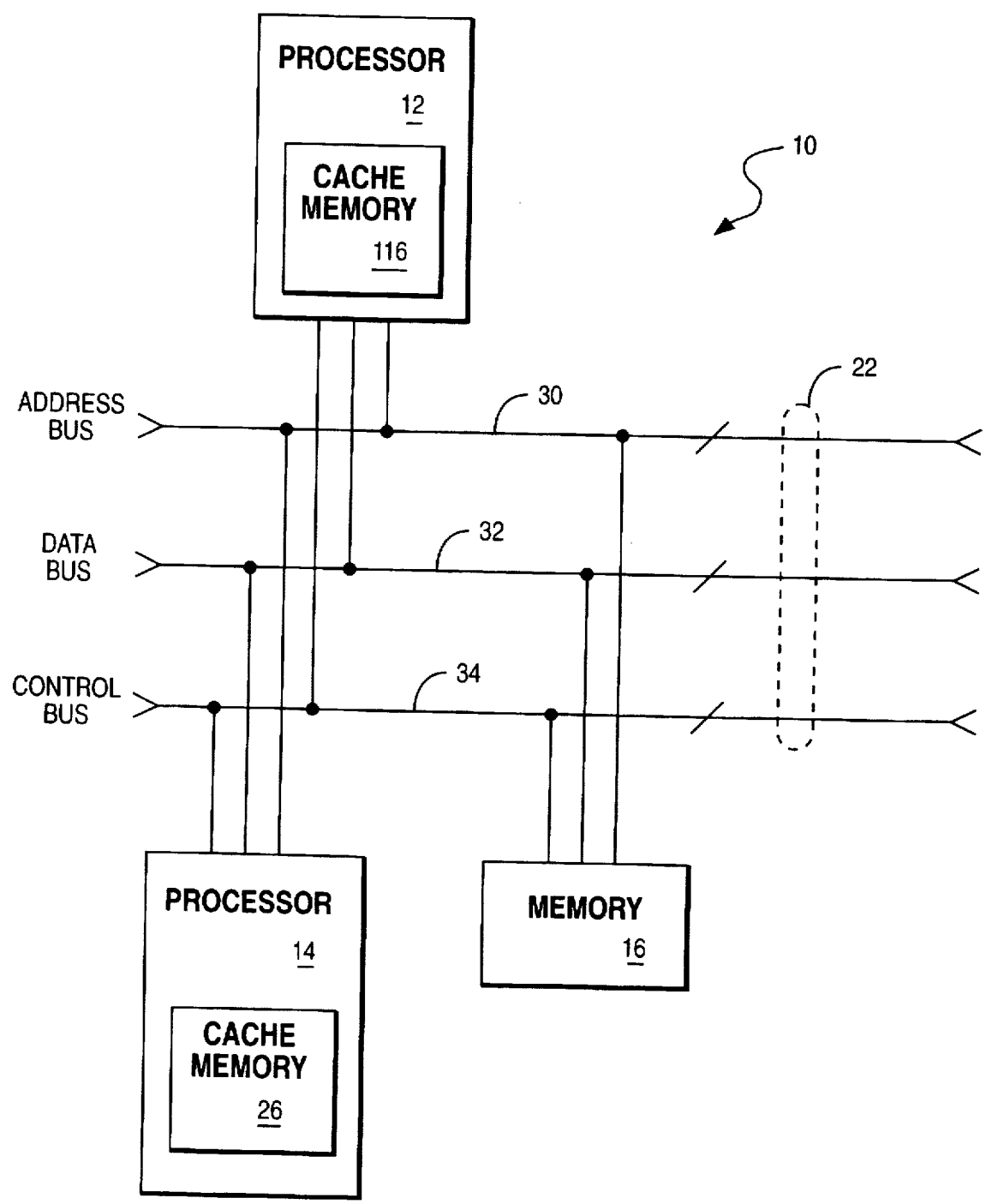
FIG. 1 is a block diagram of a system for processing information according to the illustrative embodiment.

An illustrative embodiment and its advantages are better understood by referring to FIGS. 1–5 of the drawing.

FIG. 1 is a block diagram of a system, indicated generally at 10, for processing information according to the illustrative embodiment. System 10 includes hardware devices, namely a processor 12, a processor 14 and a system memory 16. Each of the hardware devices includes respective electronic circuitry. Moreover, system 10 includes a system bus 22.

In the illustrative embodiment, processor 12 is a single integrated circuit. Accordingly, processor 12 includes a data cache memory 116 integral with processor 12. Also, processor 14 includes a data cache memory 26.

System bus 22 includes an address bus 30, a data bus 32, and a control bus 34. Each of processor 12, processor 14 and memory 16 is connected to address bus 30, to data bus 32, and to control bus 34.

Cache memory 116 and cache memory 26 are relatively small high-speed memories that store copies of information from one or more potions of memory 16. For example, processor 12 is able to copy (i.e. input) information from a portion of memory 16 into cache memory 116. Moreover, processor 12 is able to modify information in cache memory 116. Further, processor 12 is able to copy (i.e. output) modified information from cache memory 116 back into memory 16.

System 10 is a coherent memory system, in which all devices of system 10 operate in response to the most recent version of information for memory 16. In such a shared memory system, the devices (e.g. processors 12 and 14) cooperate to maintain coherency of shared information within memory 16. Processors 12 and 14 are substantially identical to one another, and processor 12 is a representative one of processors 12 and 14. In the illustrative embodiment, each of processors 12 and 14 maintains memory coherency in the same manner, according to a modified-exclusive-shared-invalid ("MESI") technique, which is more completely described in the publication entitled *PowerPC 604 RISC Microprocessor User's Manual*, published by IBM Microelectronics Division, Hopewell Junction, N.Y. Telephone 1-800-PowerPC, which is hereby fully incorporated by reference herein.

Figure 2:
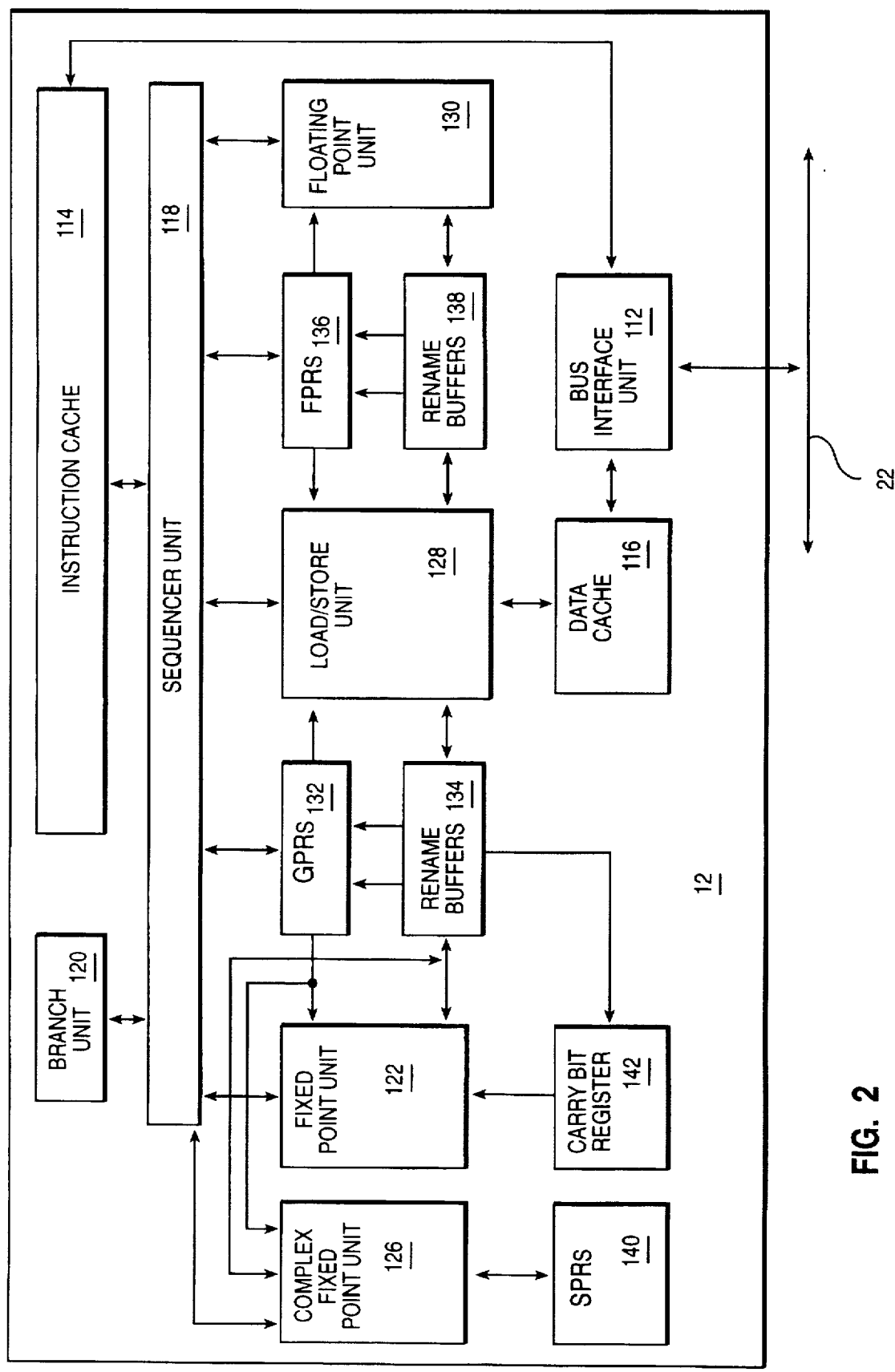
FIG. 2 is a block diagram of a processor of the system of FIG. 1.

FIG. 2 is a block diagram of processor 12. In the illustrative embodiment, processor 12 is a single integrated circuit superscalar microprocessor. Accordingly, as discussed further hereinbelow, processor 12 includes various units, registers, buffers, memories, and other sections, all of which are formed by integrated circuitry. Also, in the illustrative embodiment, processor 12 operates according to reduced instruction set computing ("RISC") techniques. As shown in FIG. 2, system bus 22 is connected to a bus interface unit ("BIU") 112 of processor 12. BIU 112 controls the transfer of information between processor 12 and system bus 22.

BIU 112 is connected to an instruction cache 114 and to data cache 116 of processor 12. Instruction cache 114 outputs instructions to a sequencer unit 118. In response to such instructions from instruction cache 114, sequencer unit 118 selectively outputs instructions to other execution circuitry of processor 12.

In addition to sequencer unit 118, in the illustrative embodiment, the execution circuitry of processor 12 includes multiple execution units, namely a branch unit 120, a fixed point unit ("FXU") 122, a complex fixed point unit ("CFXU") 126, a load/store unit ("LSU") 128 and a floating point unit ("FPU") 130. FXU 122, CFXU 126 and LSU 128 input their source operand information from general purpose architectural registers ("GPRs") 132 and fixed point rename buffers 134. Moreover, FXU 122 inputs a "carry bit" from a carry bit ("CA") register 142. FXU 122, CFXU 126 and LSU 128 output results (destination operand information) of their operations for storage at selected entries in fixed point rename buffers 134. Also, CFXU 126 inputs and outputs source operand information and destination operand information to and from special purpose registers ("SPRs") 140.

FPU 130 inputs its source operand information from floating point architectural registers ("FPRs") 136 and floating point rename buffers 138. FPU 130 outputs results (destination operand information) of its operation for storage at selected entries in floating point rename buffers 138.

In response to a LOAD instruction, LSU 128 inputs (i.e. reads) information from data cache 116 and copies (i.e. writes) such information into selected ones of rename buffers 134 and 138. If such information is not already stored in data cache 116, then data cache 116 inputs such information from system memory 16 (FIG. 1) through system bus 22 and BIU 112. Moreover, data cache 116 is able to output (i.e. write) information from data cache 116 into system memory 16 (FIG. 1) through BIU 112 and system bus 22. In response to a STORE instruction, LSU 128 inputs information from a selected one of GPRs 132 and FPRs 136 and copies such information into data cache 116.

Sequencer unit 118 inputs and outputs information to and from GPRs 132 and FPRs 136. From sequencer unit 118, branch unit 120 inputs instructions and signals indicating a present state of processor 12. In response to such instructions and signals, branch unit 120 outputs (to sequencer unit 118) signals indicating suitable memory addresses storing a sequence of instructions for execution by processor 12. In response to such signals from branch unit 120, sequencer unit 118 inputs the indicated sequence of instructions from instruction cache 114. If one or more of the sequence of instructions is not stored in instruction cache 114, then instruction cache 114 inputs such instructions from system memory 16 (FIG. 1) through system bus 22 and BIU 112.

In response to the instructions input from instruction cache 114, sequencer unit 118 selectively dispatches the instructions to selected ones of execution units 120, 122, 126, 128 and 130. Each execution unit executes one or more instructions of a particular class of instructions. For example, FXU 122 executes a first class of fixed point mathematical operations on source operands, such as addition, subtraction, ANDing, ORing and XORing. CFXU 126 executes a second class of fixed point operations on source operands, such as fixed point multiplication and division. FPU 130 executes floating point operations on source operands, such as floating point multiplication and division.

As information is stored at a selected one of rename buffers 134, such information is associated with a storage location (e.g. one of GPRs 132 or CA register 142) as specified by the instruction for which the selected rename buffer is allocated. Information stored at a selected one of rename buffers 134 is copied to its associated one of GPRs 132 (or CA register 142) in response to signals from sequencer unit 118. Sequencer unit 118 directs such copying of information stored at a selected one of rename buffers 134 in response to "completing" the instruction that generated the information. Such copying is called "writeback".

As information is stored at a selected one of rename buffers 138, such information is associated with one of FPRs 136. Information stored at a selected one of rename buffers 138 is copied to its associated one of FPRs 136 in response to signals from sequencer unit 118. Sequencer unit 118 directs such copying of information stored at a selected one of rename buffers 138 in response to "completing" the instruction that generated the information.

Processor 12 achieves high performance by processing multiple instructions simultaneously at various ones of execution units 20, 22, 26, 28 and 30. Accordingly, each instruction is processed as a sequence of stages, each being executable in parallel with stages of other instructions. Such a technique is called "pipelining". In the illustrative embodiment, an instruction is normally processed as six stages, namely fetch, decode, dispatch, execute, completion, and writeback.

In the fetch stage, sequencer unit 118 selectively inputs (from instruction cache 114) one or more instructions from one or more memory addresses storing the sequence of instructions discussed further hereinabove in connection with branch unit 120 and sequencer unit 118.

In the decode stage, sequencer unit 118 decodes up to two fetched instructions.

In the dispatch stage, sequencer unit 118 selectively dispatches up to two decoded instructions to selected (in response to the decoding in the decode stage) ones of execution units 20, 22, 26, 28 and 30 after reserving rename buffer entries for the dispatched instructions' results (destination operand information). In the dispatch stage, operand information is supplied to the selected execution units for dispatched instructions. Processor 12 dispatches instructions in order of their programmed sequence.

In the execute stage, execution units execute their dispatched instructions and output results (destination operand information) of their operations for storage at selected entries in rename buffers 134 and rename buffers 138 as discussed further hereinabove. In this manner, processor 12 is able to execute instructions out-of-order relative to their programmed sequence.

In the completion stage, sequencer unit 118 indicates an instruction is "complete". Processor 12 "completes" instructions in order of their programmed sequence.

In the writeback stage, sequencer 18 directs the copying of information from rename buffers 134 and 138 to GPRs 132 and FPRs 136, respectively. Sequencer unit 118 directs such copying of information stored at a selected rename buffer. Likewise, in the writeback stage of a particular instruction, processor 12 updates its architectural states in response to the particular instruction. Processor 12 processes the respective "writeback" stages of instructions in order of their programmed sequence. Processor 12 advantageously merges an instruction's completion stage and writeback stage in specified situations.

In the illustrative embodiment, each instruction requires one machine cycle to complete each of the stages of instruction processing. Nevertheless, some instructions (e.g., complex fixed point instructions executed by CFXU 126) may require more than one cycle. Accordingly, a variable delay may occur between a particular instruction's execution and completion stages in response to the variation in time required for completion of preceding instructions.

Figure 3:
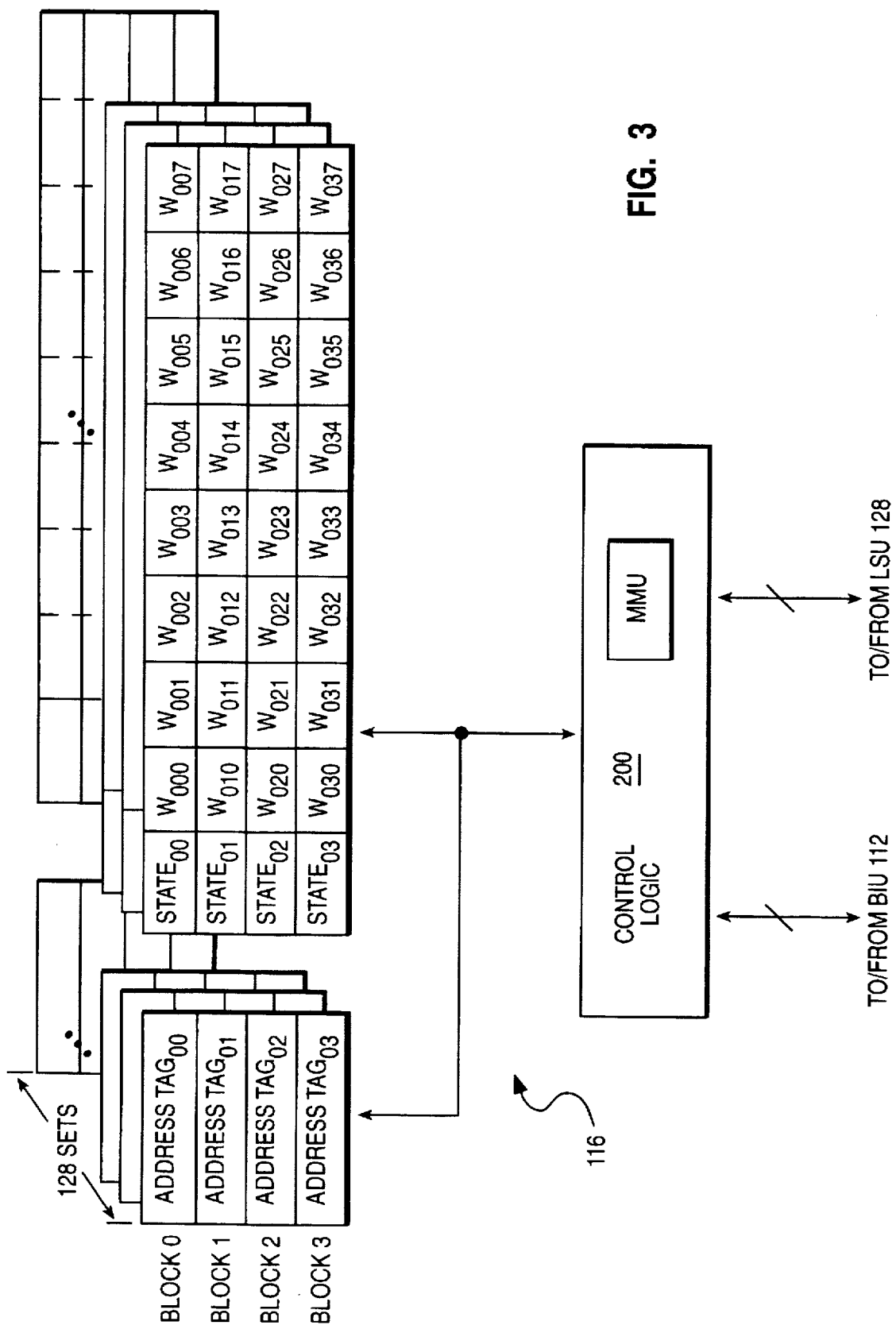
FIG. 3 is a block diagram of a cache memory of the processor of FIG. 2.

FIG. 3 is a block diagram of data cache 116. Data cache 116 is a 16-kilobyte, four-"way" set-associative cache. Data cache 116 is addressed in response to physical (i.e. "real") addresses. Accordingly, FIG. 3 shows control logic 200 which includes a memory management unit ("MMU") for translating effective addresses into associated physical addresses.

For example, LSU 128 receives LOAD and STORE instructions from sequencer unit 118. LSU 128 decodes (1) a LOAD instruction to determine a source effective address from which LSU 128 is to copy information into a specified one of GPRs 132 or FPRs 136 (via selected ones of rename buffers 134 and 138, respectively) and (2) a STORE instruction to determine a target effective address into which LSU 128 is to copy information from a specified one of GPRs 132 or FPRs 136. In connection with LSU 128 executing such LOAD and STORE instructions, LSU 128 outputs the source and target effective addresses to data cache 116, and the MMU of control logic 200 translates such effective addresses into their associated physical addresses.

In the illustrative embodiment, an effective address's bits $2^0$ through $2^{11}$ are unchanged by translation into its associated physical address, so the effective address's bits $2^0$ through $2^{11}$ have the same digital logic values as the associated physical address's bits $2^0$ through $2^{11}$.

Data cache 116 is logically arranged into 128 congruence classes (i.e. sets) as shown in FIG. 3. As an example, each set has a respective preassigned associated group of four lines (i.e. four "ways", Blocks 0–3) within data cache 116. Each line is able to store a respective address tag, respective state bits, and a respective group of eight words of information. Each word has 4 bytes (i.e. 32 bits).

Thus, Block 3 of Set 0 is able to store an Address $Tag_{03}$, state bits $State_{03}$, and words $W_{030}$ through $W_{037}$. Likewise, each Block y of Set x is able to store an Address $Tag_{xy}$, state bits $State_{xy}$, and words $W_{xy0}$ through $W_{xy7}$, where x is a variable integer set number ranging from 0 through 127, and where y is a variable integer block number ranging from 0 through 3.

According to the MESI technique, state bits $State_{xy}$ include bits which indicate whether words $W_{xy0}$ through $W_{xy7}$ are either (1) exclusive modified ("M"), (2) exclusive unmodified ("E"), (3) shared ("S") or (4) invalid ("I"), so that each line within data cache 116 has its own respective MESI state.

A set is specified by a physical address's bits $2^5$ through $2^{11}$. Thus, each set includes multiple addresses, all of which share the same seven physical address bits $2^5$ through $2^{11}$. Accordingly, at any single moment, data cache 116 stores information for up to four physical addresses belonging to a particular Set x, as specified by Address $Tag_{x0}$ through Address $Tag_{x3}$ stored in Set x's associated group of four lines within data cache 116.

For example, (a) in Block 0 of Set 0, data cache 116 can store Address $Tag_{00}$ including a first address's bits $2^{12}$ through $2^{31}$, (b) in Block 1 of Set 0, data cache 116 can store Address $Tag_{01}$ including a second address's bits $2^{12}$ through $2^{31}$, (c) in Block 2 of Set 0, data cache 116 can store Address $Tag_{02}$ including a third address's bits $2^{12}$ through $2^{31}$, and (d) in Block 3 of Set 0, data cache 116 can store Address $Tag_{03}$ including a fourth address's bits $2^{12}$ through $2^{31}$. Thus, each Address $Tag_{xy}$ has 20 bits.

Each 20-bit Address $Tag_{xy}$ includes a respective group of 20 static random access memory ("SRAM") cells. Each SRAM cell is able to store a respective single bit of digital information. Similarly, each 32-bit word $W_{xyz}$ includes a respective group of 32 SRAM cells. Likewise, the number of S cells in each $State_{xy}$ is equal to the number of bits per $State_{xy}$.

Through a bus as shown in FIG. 3, address tag information is transferred between control logic 200 and Address $Tag_{xy}$, state information is transferred between control logic 200 and $State_{xy}$, and data information is transferred between control logic 200 and $W_{xyz}$. Control logic 200 controls and reads the digital logic values of information within Address $Tag_{xy}$, $State_{xy}$ and $W_{xyz}$.

Control logic 200 implements a least recently used ("LRU") replacement policy on a line-by-line basis for storing new information within data cache 116. Processor 12 is able to perform write (i.e. STORE) operations to data cache 116 on a byte-by-byte, half-word, word, or double-word basis. Moreover, processor 12 is able to perform a full read-modify-write operation to data cache 116 during a single machine cycle of processor 12. Data cache 116 selectively operates in either write-back or write-through mode, and it implements control of cacheability, write policy, and memory coherency on a page-by-page line-by-line basis.

In an example operation, control logic 200 receives an effective address from either LSU 128 (e.g. in connection with execution by LSU 128 of a LOAD or STORE instruction) or BIU 112 (e.g. in connection with snooping by BIU 112 of communications through system bus 22). Control logic 200 determines a particular Set x in response to the received effective address's bits $2^5$ through $2^{11}$ (as discussed hereinabove), and control logic 200 inputs information from Blocks 0–3 of Set x. More particularly, control logic 200 reads the four address tags, Address $Tag_{x0}$, Address $Tag_{x1}$, Address $Tag_{x2}$ and Address $Tag_{x3}$, and their respectively associated four states, $State_{x0}$, $State_{x1}$, $State_{x2}$ and $State_{x3}$.

Further, in the example of processor 12 performing a STORE operation to data cache 116 on a double-word basis, in response to the received effective address's bits $2^3$ and $2^4$, control logic 200 inputs (i.e. receives) a selected double-word from Block 0 of Set x. For example, the selected double-word is from either (a) the SRAM cells denoted as $W_{x00}$ and $W_{x01}$, (b) the SRAM cells denoted as $W_{x02}$ and $W_{x03}$, (c) the SRAM cells denoted as $W_{x04}$ and $W_{x05}$, or (d) the SRAM cells denoted as $W_{x06}$ and $W_{x07}$. Likewise, in response to the received effective address's bits $2^3$ and $2^4$, control logic 200 inputs a selected double-word from Block 1 of Set x, a selected double-word from Block 2 of Set x, and a selected double-word from Block 3 of Set x.

MMU of control logic 200 translates the received effective address into a specific physical address. Control logic 200 compares the specific physical address's bits $2^{12}$ through $2^{31}$ against any valid Address $Tag_{xy}$. Validity of an Address $Tag_{xy}$ is indicated by digital logic values of the MESI bits in $State_{xy}$ associated with Address $Tag_{xy}$. In response to such a comparison, if the specific physical address's bits $2^{12}$ through $2^{31}$ are a match with any valid Address $Tag_{xy}$, then control logic 200 outputs (to either LSU 128 or BIU 112) either (a) the selected double-word from Block 0 of Set x if the match is with Address $Tag_{x0}$, (b) the selected double-word from Block 1 of Set x if the match is with Address $Tag_{x1}$, (c) the selected double-word from Block 2 of Set x if the match is with Address $Tag_{x2}$ or (d) the selected double-word from Block 3 of Set x if the match is with Address $Tag_{x3}$.

Figure 4A:
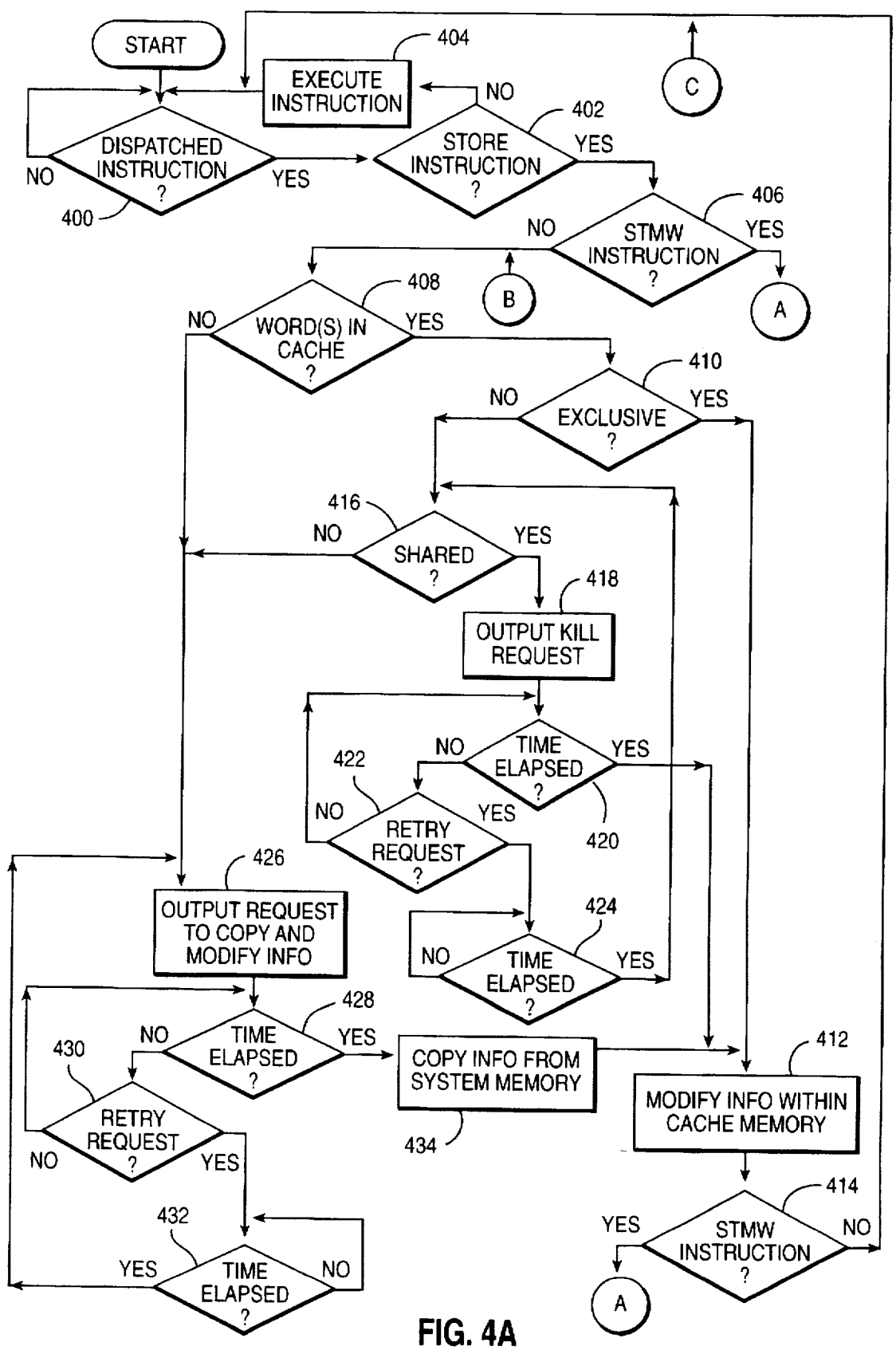
FIGS. 4A and 4B are flow charts of a method of maintaining memory coherency according to the illustrative embodiment.
Figure 4B:
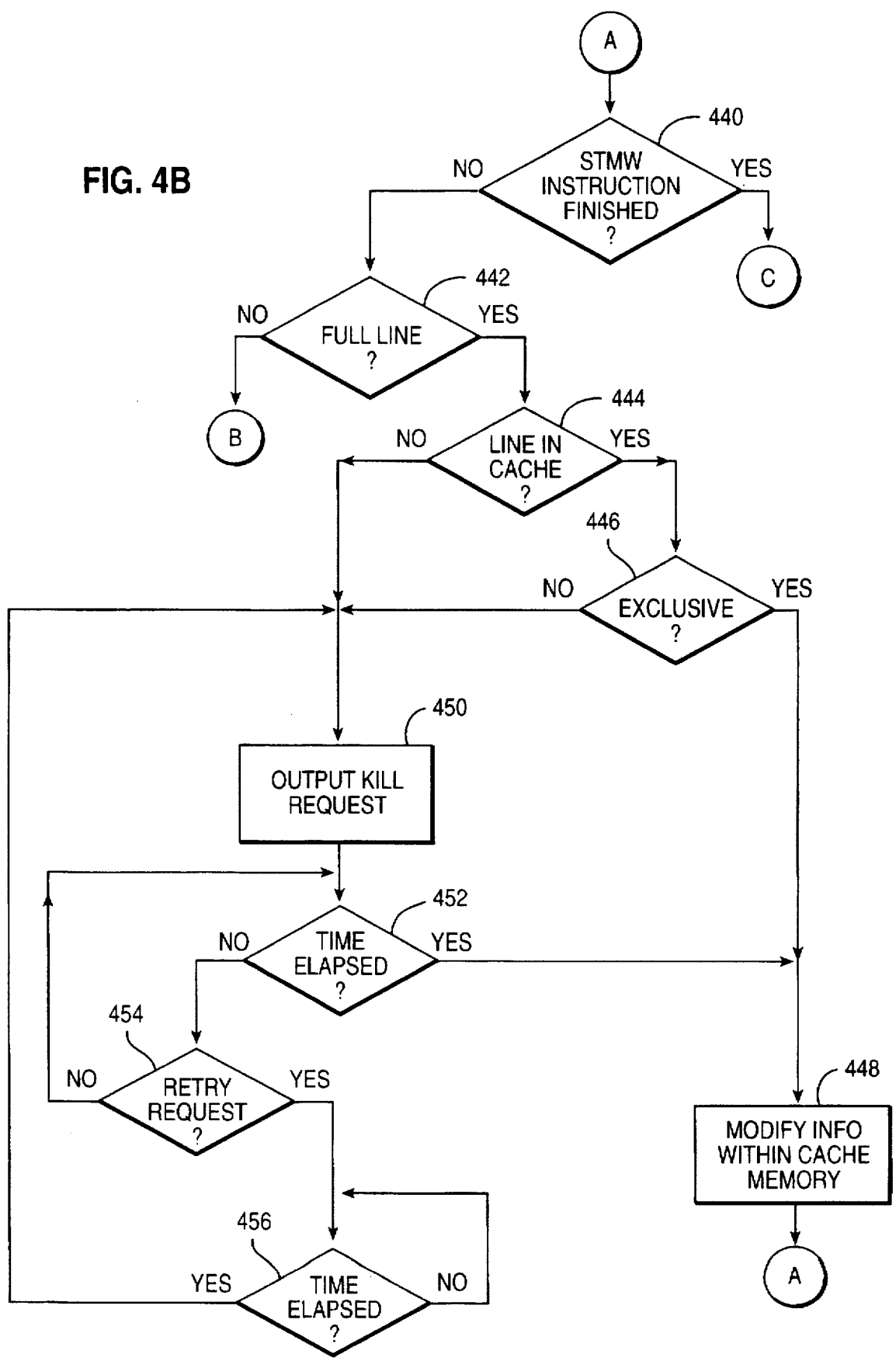

FIGS. 4A and 4B are flow charts of a method of maintaining memory coherency, according to the illustrative embodiment. This method is implemented by processors 12 and 14. As discussed further hereinbelow in connection with FIGS. 4a–b, according to the MESI technique, in order to modify (i.e. write) one or more bytes, half-words, or words of information at an address within memory 16, a device (e.g. processor 12) acquires exclusive ownership of an entire line (i.e. 8 words of information from memory 16) that includes the addressed byte(s), half-word(s), or word(s). Notably, electronic circuitry of processors 12 and 14 automatically operates according to the MESI technique, so that software programming of processors 12 and 14 is not needed for memory coherency. Accordingly, the maintenance of memory coherency is transparent to software programs executed by processors 12 and 14.

Referring to FIGS. 4A and 4B, the method self-loops at a step 400 until processor 12 determines that an instruction has been dispatched by sequencer unit 118. Then, at a step 402, processor 12 determines whether the dispatched instruction is a STORE instruction. For example, processor 12 is able to execute a STORE instruction (i.e. STORE operation) for writing one or more bytes, half-words, or words of new information to one or more addresses within memory 16 (i.e. for modifying information at an address within memory 16).

If the dispatched instruction is not a STORE instruction, the method continues from step 402 to a step 404 where processor 12 executes the instruction as discussed further hereinabove in connection with FIG. 2. After step 404, the method returns to step 400. But in response to processor 12 determining at step 402 that the dispatched instruction is a STORE instruction, the method continues to a step 406.

At step 406, processor 12 determines whether the STORE instruction is a "Store Multiple Word" ("STMW") instruction. In the illustrative embodiment and by way of example only, an STMW instruction specifies an effective address and a GPRy, where GPRy is one of GPRs 132 (FIG. 2), y is a variable number, GPRs 132 include a GPR0≦GPRy≦GPRq, and T=q+1 is the total number of GPRs 132. In response to an STMW instruction, processor 12 executes the STMW instruction by storing N words consecutively (i.e. in order), from GPRy through and including GPRq, into data cache memory 116 starting at the specified effective address, where N=T−y. In alternative embodiments, an STMW instruction specifies any variety of multiple words to be stored into data cache memory 116.

If the STORE instruction is not an STMW instruction, then the STORE instruction specifies less than an entire line (i.e. less than all of a portion of the information stored within data cache memory 116, where the "portion" in this example is the entire line) of information to be stored into data cache memory 116. Accordingly, in such a situation, the method continues from step 406 to a step 408. At step 408, processor 12 determines whether cache memory 116 already stores a line (i.e. 8 words of information from memory 16) that includes the addressed byte, half-word, word, double-word, or STMW partial line (e.g. see discussion further hereinbelow in connection with step 442 of FIGS. 4a–b). If cache memory 116 already stores such a line, the method continues to a step 410.

At step 410, processor 12 determines whether cache memory 116 stores such a line in an exclusive state (i.e. in either the exclusive modified M state or exclusive unmodified E state). If cache memory 116 stores such a line in an exclusive state, then processor 12 automatically writes the new information into the line within cache memory 116 at a step 412, which is faster than writing the new information directly into memory 16 through system bus 22. In such a situation, after processor 12 writes the new information into the line within cache memory 116 at step 412, the entire line (including the new information) remains stored in cache memory 116 in the exclusive modified M state (thereby indicating, for later use, that the line is previously modified), even if only a half-word of new information was written into the line at step 412.

After step 412, the method continues to a step 414. At step 414, processor 12 again determines whether the STORE instruction is an STMW instruction. If the STORE instruction is not an STMW instruction, the method returns from step 414 to step 400.

If processor 12 determines at step 410 that cache memory 116 does not store such a line in an exclusive state, the method continues to a step 416. At step 416, processor 12 determines whether cache memory 116 stores such a line in the shared S state. If cache memory 116 stores such a line in the shared S state, the method continues to a step 418 where processor 12 automatically outputs (through system bus 22) a request to "kill" any line (that includes the addressed byte, half-word, word, double-word, or STMW partial line) in any cache memory of another device of system 10. Processor 12 specifies such a request by outputting one or more signals on control bus 34 and by outputting the line's physical address through address bus 30. Processor 12 outputs such a request in connection with processor 12 writing (i.e. storing into) less than an entire line of information into data cache memory 116.

In response to such a kill request, if cache memory 26 of processor 14 stores the addressed line (i.e. 8 words of information from memory 16 that include the addressed byte, half-word, word, double-word, or STMW partial line), then processor 14 invalidates the entire addressed line within cache memory 26 by suitably modifying state bits within cache memory 26. Nevertheless, within a predetermined time period after processor 12 outputs the kill request at step 418, it is possible that processor 14 may not have sufficient resources available to either (a) determine whether cache memory 26 stores a line that includes the addressed byte, half-word, word, double-word, or STMW partial line and/or (b) invalidate the entire line within cache memory 26 by suitably modifying state bits within cache memory 26. If processor 14 has such resources available, then processor 14 takes no further action in response to the request by processor 12, such that a "null" response (i.e. no response) is output from and by processor 14 (including cache memory 26) within the predetermined time period after processor 12 outputs the kill request at step 418.

But if processor 14 does not have such resources available, then processor 14 outputs a retry request (specified by a signal on control bus 34) to processor 12. The retry request is for requesting processor 12 to later retry outputting its request.

Thus, after processor 12 outputs the kill request at step 418, the method continues from step 418 to a step 420 where processor 12 determines whether the predetermined time period has elapsed. If the predetermined time period has not elapsed, the method continues to a step 422 where processor 12 determines whether BIU 112 has received a retry request through system bus 22. If BIU 112 has not received a retry request, the method returns from step 422 to step 420.

But if BIU 112 receives a retry request through system bus 22 within the predetermined time period, the method continues from step 422 to a step 424 where the method self-loops until processor 12 determines that another predetermined time period has elapsed. In this manner, processor 14 has an opportunity to resolve the condition that resulted in the retry request. After processor 12 determines that another predetermined time period has elapsed, the method returns from step 424 to step 416.

If processor 12 determines at step 420 that the predetermined time period has elapsed without BIU 112 receiving a retry request through system bus 22, the method continues from step 420 to step 412.

If processor 12 determines either (a) at step 408 that cache memory 116 does not already store a line (i.e. 8 words of information from memory 16) that includes the addressed byte, half-word, word, double-word, or STMW partial line, or (b) at step 416 that cache memory 116 does not store such a line in the shared S state, then the method continues to a step 426.

At step 426, processor 12 automatically outputs (through system bus 22) a request to copy an entire line of information (that includes the addressed byte, half-word, word, double-word, or STMW partial line) from memory 16 and to modify at least a portion of such line. Processor 12 specifies such a request by outputting one or more signals on control bus 34 and by outputting the line's physical address through address bus 30.

As another device with a cache memory, processor 14 responds to such a request by snooping cache memory 26 to determine whether cache memory 26 stores the addressed line (i.e. 8 words of information from memory 16) that includes the addressed byte, half-word, word, double-word, or STMW partial line. If processor 14 determines that cache memory 26 does not store such a line, then processor 14 takes no further action in response to the request by processor 12, such that a "null" response (i.e. no response) is output from and by processor 14 (including cache memory 26) within a predetermined time period after processor 12 outputs the request (to copy and modify) at step 426. But if processor 14 determines that cache memory 26 stores such a line other than in the exclusive modified M state (indicating the line is not modified within cache memory 26 relative to an original version of the line actually stored in the addressed portion of memory 16 at the same physical address), then processor 14 invalidates the entire line within cache memory 26 by suitably modifying state bits within cache memory 26.

By comparison, if processor 14 determines that cache memory 26 stores such a line in the exclusive modified M state (indicating the line is modified within cache memory 26 relative to an original version of the line actually stored in the addressed portion of memory 16 at the same physical address), then processor 14 outputs a retry request (specified by a signal on control bus 34) to processor 12. Also, processor 14 outputs such a retry request if, within a predetermined time period after processor 12 outputs the request at step 426, processor 14 does not have sufficient resources available to either (a) determine whether cache memory 26 stores a line that includes the addressed byte, half-word, word, double-word, or STMW partial line and/or (b) invalidate the entire line within cache memory 26 by suitably modifying state bits within cache memory 26.

Thus, after processor 12 outputs the request to copy an entire line of information (that includes the addressed byte, half-word, word, double-word, or STMW partial line) from memory 16 and to modify at least a portion of such line, the method continues from step 426 to a step 428 where processor 12 determines whether the predetermined time period has elapsed. If the predetermined time period has not elapsed, the method continues to a step 430 where processor 12 determines whether BIU 112 has received a retry request through system bus 22.

If BIU 112 has not received a retry request, the method returns from step 430 to step 428. But if BIU 112 receives a retry request through system bus 22 within the predetermined time period, the method continues from step 430 to a step 432 where the method self-loops until processor 12 determines that another predetermined time period has elapsed. In this manner, processor 14 has an opportunity to resolve the condition that resulted in the retry request.

More particularly, processor 14 has an opportunity to update memory 16 by copying the modified line of information from cache memory 26 back to the same physical address(es) within memory 16 and to invalidate the line within cache memory 26 by suitably modifying state bits within cache memory 26. Processor 14 copies the modified line back to memory 16 by outputting the line's physical address through address bus 30 and by outputting the modified line of information through data bus 32. After processor 12 determines that another predetermined time period has elapsed, the method returns from step 432 to step 426.

If processor 12 determines at step 428 that the predetermined time period has elapsed without BIU 112 receiving a retry request through system bus 22, the method continues from step 428 to a step 434. At step 434, processor 12 copies an entire line of information (that includes the addressed byte, half-word, word, double-word, or STMW partial line) from memory 16 into data cache memory 116. After step 434, the method continues to step 412. Accordingly, such copying at step 434 by processor 12 of the entire line of information from memory 16 into data cache memory 116 is (1) in connection with processor 12 writing (i.e. storing into) less than an entire line of information into data cache memory 116 and (2) in response to the line being previously modified within memory 16 and/or cache memory 26 relative to invalid information already stored within data cache memory 116. In response to the line being previously modified within cache memory 26, processor 12 copies (at step 434) the line from memory 16 into data cache memory 116 after the line is copied from cache memory 26 into memory 16.

In a significant aspect of the illustrative embodiment, in response to processor 12 determining at step 406 that the STORE instruction is an STMW instruction, the method continues to a step 440. At step 440, processor 12 determines whether it has finished executing the STMW instruction. Of course, when the method continues to step 440 for the first time, processor 12 will not have finished executing the STMW instruction.

But when the method continues to step 440 for a subsequent time, processor 12 may have finished executing the STMW instruction. If processor 12 has finished executing the STMW instruction, the method returns from step 440 to step 400. By comparison, if processor 12 has not finished executing the STMW instruction, the method continues from step 440 to a step 442.

At step 442, processor 12 determines whether the unexecuted portion of the STMW instruction specifies a sufficient number of GPRs (of GPRs 132) so that an entire line (i.e. 8 words of information from memory 16) is to be written to consecutive physical addresses starting at the beginning of the line (i.e. starting at a physical address whose bits $2^0$ through $2^4$=00000). If a sufficient number of GPRs is not specified, the method continues from step 442 to step 408. By comparison, in response to processor 12 determining a sufficient number of GPRs are specified, the method continues from step 442 to a step 444, as the STMW instruction specifies an entire line (i.e. all of a portion of the information stored within data cache memory 116, where the "portion" in this example is the entire line) of information to be stored into data cache memory 116.

At step 444, processor 12 determines whether cache memory 116 already stores the line into which 8 words of information are to be written to consecutive physical addresses starting at a physical address whose bits $2^0$ through $2^4$=00000. If cache memory 116 already stores the line, the method continues to a step 446. At step 446, processor 12 determines whether cache memory 116 stores such a line in an exclusive state (i.e. in either the exclusive modified M state or exclusive unmodified E state).

If cache memory 116 stores such a line in an exclusive state, then processor 12 automatically writes the new information into the entire line within cache memory 116 at a step 448, which is faster than writing the new information directly into memory 16 through system bus 22. In such a situation, after processor 12 writes the new information into the line within cache memory 116 at step 448, the entire line (including the new information) remains stored in cache memory 116 in the exclusive modified M state. After step 448, the method returns to step 440.

If processor 12 determines either (a) at step 444 that cache memory 116 does not already store the line into which 8 words of information are to be written to consecutive physical addresses starting at a physical address whose bits $2^0$ through $2^4$=00000, or (b) at step 446 that cache memory 116 does not store such a line in an exclusive state, then the method continues to a step 450. At step 450, processor 12 automatically outputs (through system bus 22) a kill request. Processor 12 specifies such a request by outputting one or more signals on control bus 34 and by outputting the line's physical address through address bus 30. Processor 12 outputs such a request in connection with processor 12 writing (i.e. storing into) an entire line of information into data cache memory 116.

In response to such a kill request, if cache memory 26 of processor 14 stores the addressed line, then processor 14 invalidates the entire addressed line within cache memory 26 by suitably modifying state bits within cache memory 26. Nevertheless, within a predetermined time period after processor 12 outputs the kill request at step 450, it is possible that processor 14 may not have sufficient resources available to either (a) determine whether cache memory 26 stores the addressed line and/or (b) invalidate the entire addressed line within cache memory 26 by suitably modifying state bits within cache memory 26. If processor 14 has such resources available, then processor 14 takes no further action in response to the request by processor 12, such that a "null" response (i.e. no response) is output from and by processor 14 (including cache memory 26) within the predetermined time period after processor 12 outputs the kill request at step 450. But if processor 14 does not have such resources available, then processor 14 outputs a retry request (specified by a signal on control bus 34) to processor 12.

Thus, after processor 12 outputs the kill request at step 450, the method continues from step 450 to a step 452 where processor 12 determines whether the predetermined time period has elapsed. If the predetermined time period has not elapsed, the method continues to a step 454 where processor 12 determines whether BIU 112 has received a retry request through system bus 22. If BIU 112 has not received a retry request, the method returns from step 454 to step 452.

But if BIU 112 receives a retry request through system bus 22 within the predetermined time period, the method continues from step 454 to a step 456 where the method self-loops until processor 12 determines that another predetermined time period has elapsed. In this manner, processor 14 has an opportunity to resolve the condition that resulted in the retry request. After processor 12 determines that another predetermined time period has elapsed, the method returns from step 456 to step 450.

If processor 12 determines at step 452 that the predetermined time period has elapsed without BIU 112 receiving a retry request through system bus 22, the method continues from step 452 to step 448. Advantageously, the method continues from step 452 directly to step 448, without processor 12 copying an entire line of information (that includes the addressed line) from memory 16 into data cache memory 116, independent of whether such a line is previously modified within memory 16 and/or cache memory 26. This is practical because, at step 448, processor 12 writes new information into the entire line within cache memory 116. More particularly, at step 448, processor 12 modifies an entire line (i.e. 32 bytes) by writing 32 bytes of new information to consecutive physical addresses starting at the beginning of the line (i.e. starting at a physical address whose bits $2^0$ through $2^4$=00000).

In contrast, at step 412, within the 32-byte line, processor 12 modifies only an addressed byte, half-word, word, double-word, or STMW partial line (i.e. less than all of a portion of the information stored within data cache memory 116, where the "portion" in this example is an entire 32-byte line). Consequently, before step 412, since coherency of information within system 10 is maintained on a line-by-line basis, it is important for processor 12 to ensure that non-modified portions of the 32-byte line are coherent with respect to other devices (e.g. memory 16 and/or cache memory 26) of system 10. Accordingly, before step 412, processor 12 achieves such coherency at step 434 by copying an entire line of information (that includes the addressed line) from memory 16 into data cache memory 116. By comparison, processor 12 advantageously avoids traffic through system bus 22 where practical, by continuing from step 452 directly to step 448, without processor 12 copying an entire line of information (that includes the addressed line) from memory 16 into data cache memory 116.

Moreover, processor 12 avoids traffic through system bus 22 where practical, by outputting a kill request at step 450 instead of a request to copy a line; in contrast, at step 426, processor 12 outputs a request to copy a line. By outputting a kill request at step 450 instead of a request to copy a line, processor 12 avoids triggering processor 14 to update memory 16 in some cases where processor 14 otherwise would have copied the modified line of information from cache memory 26 back to the same physical address(es) within memory 16. Thus, processor 12 advantageously avoids triggering extra traffic through system bus 22 by outputting a kill request at step 450 instead of a request to copy a line.

Figure 5:
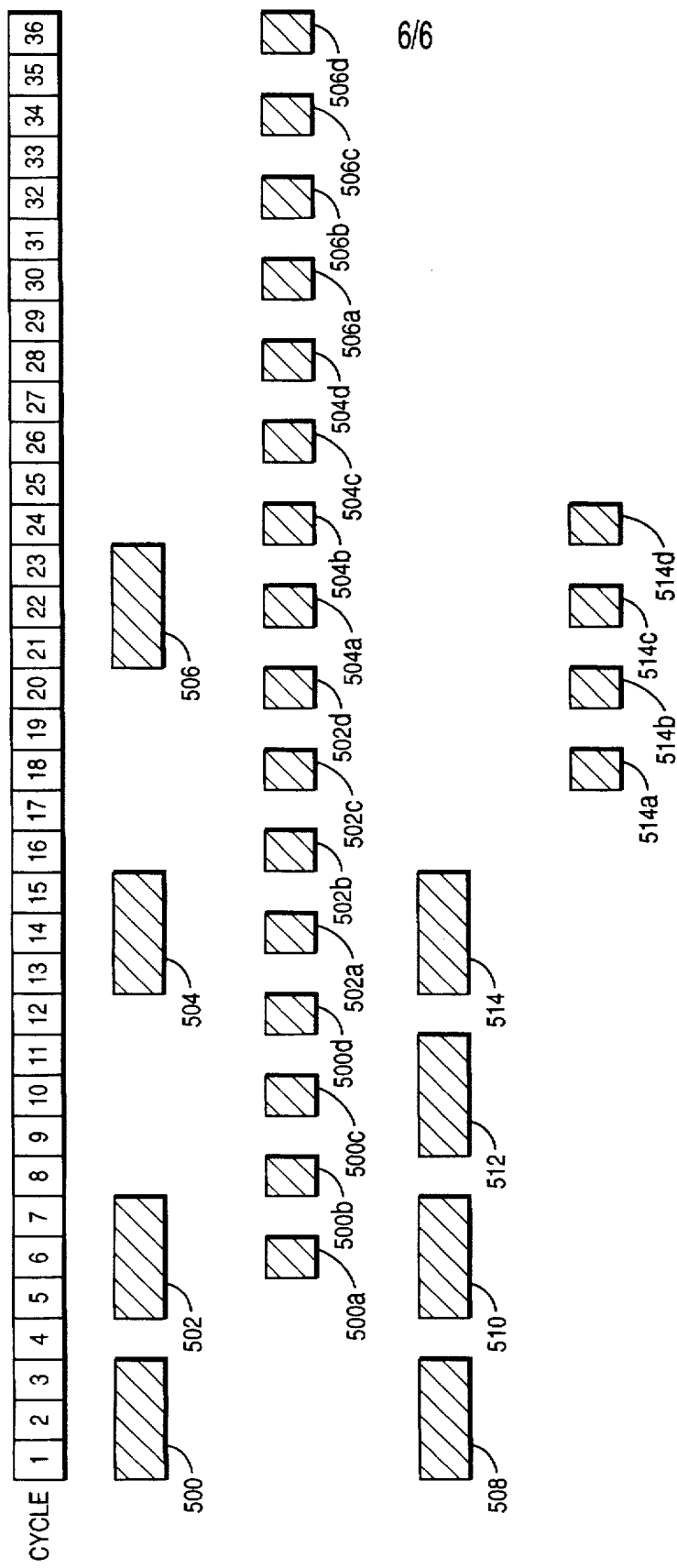
FIG. 5 is a conceptual illustration of address phases and data phases of a system bus of the system of FIG. 1.

FIG. 5 is a conceptual illustration of address phases and data phases of system bus 22 (FIG. 1). Processor 12 completes an address transaction on address bus 30 during an address phase ("tenure"). In response to the address transaction on address bus 30, processor 12 completes a data transaction on data bus 32 during a data phase ("tenure") associated with the address phase. Similarly, later information transfer operations have address phases and respectively associated data phases in response thereto.

System 10 of the illustrative embodiment supports the decoupling of address phases on address bus 30 from data phases on data bus 32. In this manner, system 10 supports split-transaction and pipelined operations on system bus 22. For example, processor 12 is able to split a transaction into an address transaction and a data transaction. Moreover, processor 12 is able to pipeline transactions by initiating a second transaction on system bus 22 before a first transaction has completed.

Accordingly, address and data phases are distinct, so that processor 12 is able to complete address phases for different information transfers before completing their respectively associated data phases. Such pipelined and split-transaction operations efficiently use data bus 32 by allowing back-to-back data phases without intervening address phases, so that multiple transactions are efficiently interleaved through system bus 22. In this manner, processor 12 is able to control address bus 30 without having to simultaneously control data bus 32. Thus, processor 12 is able to reduce traffic through system bus 22 by completing address-only transfers through address bus 30 without simultaneously using data bus 32, thereby conserving data bus bandwidth.

In the illustrative embodiment, processor 12 completes data phases in the order of their respective associated address phases. Moreover, for simplicity, processor 12 allows a maximum of two non-completed ("pending") data phases at any one time. Accordingly, if two data phases have not been completed, then processor 12 does not complete another address phase until one of the two pending data phases completes. In an alternative embodiment, processor 12 allows more than two pending data phases at a time.

FIG. 5 shows four address phases 500, 502, 504 and 506 completed by processor 12. In response to address phase 500, processor 12 completes an associated data phase indicated at 500a–d. Similarly, in response to address phase 502, processor 12 completes an associated data phase indicated at 502a–d. Further, in response to address phase 504, processor 12 completes an associated data phase indicated at 504a–d. Moreover, in response to address phase 506, processor 12 completes an associated data phase indicated at 506a–d.

As shown in FIG. 5, processor 12 is able to pipeline transactions by initiating address phase 502 before data phase 500a–d has completed. Also, processor 12 supports back-to-back data phases 504a–d and 506a–d without intervening address phases, so that multiple transactions are efficiently interleaved through system bus 22. In this manner, processor 12 is able to control address bus 30 without having to simultaneously control data bus 32. For example, during address phase 500, processor 12 is not required to simultaneously control data bus 32. Thus, processor 12 is able to reduce traffic through system bus 22 by completing address-only transfers (e.g. address phase 500) through address bus 30 without simultaneously using data bus 32, thereby conserving data bus bandwidth.

As shown in FIG. 5, processor 12 completes data phases 500a–d, 502a–d, 504a–d and 506a–d in the order of their respective associated address phases 500, 502, 504 and 506. Processor 12 allows a maximum of two pending data phases at any one time. Accordingly, processor 12 does not complete address phase 504 until after the pending data phase 500a–d completes. Similarly, processor 12 does not complete address phase 506 until after the pending data phase 502a–d completes.

In the example of FIG. 5, at least one complete cycle is required between different address phases and between different data phases. For example, address phase 500 ends during cycle 3, and a next address phase 502 starts during cycle 5. Also, at least two complete cycles are required between the end of an address phase and the start of its respectively associated data phase. For example, address phase 500 ends during cycle 3, and its respectively associated data phase 500a–d starts during cycle 6. Each data phase is divided into four double-word transmissions (i.e. four transmissions through system bus 22, each of a single double-word), where at least one complete cycle is required between transmissions of different double-words. For example, data phase 500a–d includes four double-word transmissions, namely 500a, 500b, 500c and 500d as shown in FIG. 5.

In consideration of the above-discussed aspects, the example of FIG. 5 clearly shows that a minimum of 36 bus cycles of system bus 22 are necessary for processor 12 to copy four lines of information from memory 16 into cache memory 116. This would occur, for example, if processor 12 sequentially executes four different STORE instructions which (a) are not STMW instructions and (b) are directed to information not already stored within cache memory 116, so that each of the four different STORE instructions results in processor 12 performing step 434 of FIGS. 4a–b.

In the example of FIG. 5, processor 14 does not output any retry requests in response to address phases 500, 502, 504 and 506. But if processor 14 outputs one or more retry requests in response to address phases 500, 502, 504 and/or 506, then extra bus cycles (in addition to the minimum of 36 bus cycles mentioned above) of system bus 22 would be necessary for processor 12 to copy four lines of information from memory 16 into cache memory 116.

In contrast, if processor 12 executes an STMW instruction directed to four different cache lines of information not already stored within cache memory 116, and if processor 12 performs (a) step 450 of FIGS. 4a–b three times (once per each of the first three cache lines) and (b) step 434 of FIGS. 4a–b once for the fourth cache line, then processor 12 completes four address phases 508, 510, 512 and 514, in this example, processor 12 performs step 450 of FIGS. 4a–b (i.e. outputs a kill request) three times (i.e. once per each of the first three cache lines) by completing address phases 508, 510 and 512.

Since address phases 508, 510 and 512 are completed in connection with outputting kill requests, these address phases do not have associated data phases, such that address phases 508, 510 and 512 (i.e. the kill requests) are "address-only" transactions through system bus 22. Such address-only transactions are practical in this example because, at step 448, processor 12 modifies an entire line (i.e. 32 bytes) by writing 32 bytes of new information to consecutive physical addresses starting at the beginning of the line (i.e. starting at a physical address whose bits $2^0$ through $2^4$=00000).

In response to address phase 514, processor 12 completes an associated data phase indicated at 514a–d. This is because, at step 412, within the 32-byte line, processor 12 modifies only an addressed byte, half-word, word, double-word, or STMW partial line. Consequently, before step 412, since coherency of information within system 10 is maintained on a line-by-line basis, it is important for processor 12 to ensure that non-modified portions of the 32-byte line are coherent with respect to other devices of system 10.

FIG. 5 clearly shows that a minimum of 24 bus cycles of system bus 22 are necessary in connection with processor 12 executing the STMW instruction according to the above-discussed example. In this example, processor 14 does not output any retry requests in response to address phases 508, 510, 512 and 514. But if processor 14 outputs one or more retry requests in response to address phases 508, 510, 512 and/or 514, then extra bus cycles (in addition to the minimum of 24 bus cycles mentioned above) of system bus 22 would be necessary in connection with processor 12 executing the STMW instruction according to the above-discussed example.

Without steps 406, 414, and 440-456 of FIGS. 4a-b specifically directed to execution by processor 12 of an STMW instruction according to the illustrative embodiment, a minimum of 36 bus cycles of system bus 22 would be necessary for processor 12 to copy four lines of information from memory 16 into cache memory 116. This would occur, for example, if processor 12 executed the STMW instruction by sequentially executing four different STORE instructions, as discussed further hereinabove in connection with address phases 500, 502, 504 and 506. But with steps 406, 414, and 440-456 of FIGS. 4a-b specifically directed to execution by processor 12 of an STMW instruction, 12 bus cycles (i.e. 36 bus cycles-24 bus cycles) are saved according to the example of FIG. 5, thereby advantageously reducing traffic through system bus 22. The traffic savings are significant where processor 12 frequently modifies information for memory 16 by executing STMW instructions.

Although an illustrative embodiment and its advantages have been described in detail hereinabove, they have been described as example and not as limitation. Various changes, substitutions and alterations can be made in the illustrative embodiment without departing from its breadth, scope and spirit.

What is claimed is:

1. A system, comprising:

first and second memories for storing information by lines;

circuitry coupled to said first and second memories for writing first information corresponding to a first line into said first memory without copying second information corresponding to said first line from said second memory, in response to an instruction specifying a writing of said first line of said first information and independent of whether said second information in said second memory differs from said first information;

outputting means in said circuitry for outputting a signal to said second memory before writing of said first information; and invalidating means in said second memory for invalidating said second information within said second memory in response to said signal before writing of said first information.

2. The system of claim 1 wherein said circuitry writes said first information corresponding to said first line in response to said second memory outputting a response to said signal.

3. The system of claim 2 wherein said response is a null response from said second memory within a predetermined time after said signal.

4. A system, comprising:

first and second cache memories for storing information by lines;

circuitry coupled to said first and second cache memories for;

in response to an instruction specifying first information corresponding to a first line of said information, writing all of said first information into said first cache memory without copying second information corresponding to said first line from said second cache memory, independent of whether said second information differs from said first information;

in response to said instruction specifying less than said first cache line, writing less than all of said first information into said first cache memory and, in connection with said writing less than all of said first information, copying said less than all of said second information from said second cache memory into said first cache memory in response to said less than all of said second information being previously modified within said second cache memory; and outputting a signal to said second cache memory to invalidate said second information within said second cache memory before writing said first information.

5. The system of claim 4 wherein said circuitry writes said first information in response to said second cache memory outputting a response to said signal.

6. The system of claim 5 wherein said response is a null response from said second cache memory within a predetermined time after said signal.

7. A method, comprising the steps of:

in response to an instruction specifying a portion of information, writing all of said portion into a first memory without copying any of said portion from a second memory, independent of whether said portion is previously modified within said second memory;

outputting a signal to said second memory before said writing; and invalidating said portion within said second memory in response to said signal before said writing.

8. The method of claim 7 wherein said writing comprises:

writing all of said portion in response to said second memory outputting a response to said signal.

9. The method of claim 8, wherein said response is a null response from said second memory within a predetermined time after said signal.

* * * * *